US010322700B2

(12) United States Patent
Poton et al.

(10) Patent No.: US 10,322,700 B2
(45) Date of Patent: Jun. 18, 2019

(54) LONGITUDINAL MEMBER FOR RETAINING A STIFFENING SPINE AND/OR HOLDING A WIPER BLADE FOR A WINDSCREEN WIPER

(71) Applicant: Valeo Systèmes d'Essuyage, Le Mesnil Saint Denis (FR)

(72) Inventors: Eric Poton, Pont du Chateau (FR); Stéphane Houssat, Blanzat (FR); Lionel Cros, La Roche Blanche (FR); Denis Thebault, Clermont Ferrand (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 480 days.

(21) Appl. No.: 14/598,455

(22) Filed: Jan. 16, 2015

(65) Prior Publication Data

US 2015/0203074 A1 Jul. 23, 2015

(30) Foreign Application Priority Data

Jan. 17, 2014 (FR) ..................................... 14 50409

(51) Int. Cl.
*B60S 1/38* (2006.01)
*B29L 31/30* (2006.01)
*B29C 47/00* (2006.01)
*B29C 47/02* (2006.01)

(52) U.S. Cl.
CPC ........ *B60S 1/3879* (2013.01); *B29C 47/0009* (2013.01); *B29C 47/028* (2013.01);
(Continued)

(58) Field of Classification Search
CPC .... B60S 1/3848; B60S 1/3874; B60S 1/3881; B60S 1/3882; B60S 1/381; B60S 1/3875;
(Continued)

(56) References Cited

U.S. PATENT DOCUMENTS 3,427,637 A * 2/1969 Quinlan ................ B60S 1/3801
15/250.451
4,194,261 A * 3/1980 Parkinson ............. B60S 1/3805
15/250.07
(Continued)

FOREIGN PATENT DOCUMENTS

CN 101868383 A 10/2010
DE 10 2010 062899 A1 6/2012
(Continued)

OTHER PUBLICATIONS

Machine language translation of description portion of German publication 102011078178, published Jan. 2013.*
(Continued)

*Primary Examiner* — Gary K. Graham
(74) *Attorney, Agent, or Firm* — Osha Liang LLP (57) ABSTRACT

A longitudinal member for retaining a stiffening spine and holding a wiper blade for a windscreen wiper of a window of a motor vehicle is disclosed. The member defines at least one longitudinal housing for receiving the spine and at least one longitudinal housing for receiving a heel of the wiper blade, at least one of the housings being delimited at least partly by a bottom wall and two side walls linked to the bottom wall, where the side walls have planar inner faces converging towards one another away from the bottom wall.

18 Claims, 5 Drawing Sheets

(52) U.S. Cl.
CPC .......... *B60S 1/3874* (2013.01); *B60S 1/3881* (2013.01); *B60S 1/3882* (2013.01); *B29L 2031/305* (2013.01); *B60S 1/381* (2013.01)

(58) Field of Classification Search
CPC .......... B60S 1/3879; B60S 2001/3817; B60S 2001/3818; B60J 10/20; B29C 47/0028; B29C 47/026; B29C 47/003; B29C 47/009; B29C 47/023; B29L 2031/305
USPC .......... 15/250.451, 250.43, 250.44, 250.361, 15/250.201; D12/219, 220; 428/95, 83; 264/165, 171.24, 171.12, 177.1
See application file for complete search history.

(56) References Cited

U.S. PATENT DOCUMENTS

| | | | |
|---|---|---|---|
| D323,638 S * | 2/1992 | Buechele | D12/220 |
| 8,230,546 B2 * | 7/2012 | Laurens | B60S 1/3851 |
| | | | 15/250.201 |
| 2007/0174989 A1 * | 8/2007 | Moll | B60S 1/38 |
| | | | 15/250.201 |
| 2013/0333147 A1 * | 12/2013 | Bex | B60S 1/381 |
| | | | 15/250.201 |

FOREIGN PATENT DOCUMENTS

| | | |
|---|---|---|
| DE | 10 2011 078178 A1 | 1/2013 |
| DE | 10 2011 078185 A1 | 1/2013 |
| DE | 102011086790 A1 | 5/2013 |
| DE | 102014209269 * | 11/2015 |
| EP | 2 415 645 A1 | 2/2012 |
| EP | 2 596 999 A2 | 5/2013 |

OTHER PUBLICATIONS

Preliminary Search Report issued in corresponding French Patent Application No. 1450409 dated Sep. 10, 2014 (7 pages).
The First Office Action issued in corresponding Chinese Patent Application No. 201510025526.X, dated Jan. 10, 2018 (12 pages).

* cited by examiner

PRIOR ART

Fig. 1

PRIOR ART

LONGITUDINAL MEMBER FOR RETAINING A STIFFENING SPINE AND/OR HOLDING A WIPER BLADE FOR A WINDSCREEN WIPER

The present invention relates to a longitudinal member for retaining a stiffening spine and/or holding a wiper blade for a windscreen wiper of a window of a vehicle, in particular a motor vehicle, and a windscreen wiper comprising such a member.

Typically, a windscreen wiper of a window such as the windscreen of a motor vehicle comprises a longitudinal body bearing an aerodynamic deflector, and means for holding a wiper blade, generally made of rubber, intended to rub against the window of the vehicle to dispel water by bringing it out of the field of vision of the driver. The wiper further comprises means for retaining a longitudinal spine which stiffens the wiper blade, so as to favour the application of this blade onto the windscreen. The wiper is borne by an arm which is driven by a motor in an angular reciprocating motion. Means for linking the wiper to the arm generally comprise a connector which is secured to the body and an adapter which is articulated on the connector and fixed to one end of the arm.

The means for holding the wiper blade and the means for retaining the stiffening spine are generally borne by a longitudinal member of the wiper, which is independent of the wiper body and fixed thereto by appropriate means. The member defines a first longitudinal housing for receiving the spine and a second longitudinal housing for receiving a heel of the wiper blade. Each of these housings is delimited by a bottom wall, generally horizontal (in the service position), and two side walls, generally vertical, linked to said bottom wall.

In the current state of the art, the side walls (which each have, in cross section, a rectilinear elongate form) defining each housing are perfectly parallel. The housing receiving the spine has a cross section of a rectangular form.

One problem with the current state of the art is the use of spines of different sections as a function of the length of the windscreen wiper. In order to keep a dimensional uniformity of the housing receiving the spine, it is known practice to coat the spines that have the smallest dimensions with a coating, for example of PET, in order to compensate for the dimensional differences with the spines that have the standard dimensions for insertion into the housing. This solution presents a drawback in terms of time because the coating entails an additional manufacturing step but, above all, represents a higher cost for the spine linked to the added extra material.

It is also known practice to have, on a face of the spine, a heating film, in the form of a resistive circuit, in order to provide a heating function for the wiper assembly. The application of this heating film automatically results in a dimensional variation, particularly vertical, of the spine by comparison to a spine without heating film. It is then more difficult to insert the spine equipped with the heating film into the housing.

More generally, the spine is fitted into the housing with transverse plays, in particular horizontal, to facilitate the fitting thereof by sliding longitudinally. However, these plays remain after the fitting and allow needless displacements or vibrations of the spine, which could ultimately result in early wear thereof or of the housing.

The invention proposes a simple, effective and economical solution to these problems.

The invention proposes a longitudinal member for retaining a stiffening spine and holding a wiper blade for a windscreen wiper of a window of a vehicle, in particular a motor vehicle, said member defining at least one first longitudinal housing for receiving the spine and at least one second longitudinal housing for receiving a heel of the wiper blade, at least one of said first and second housings being delimited at least partly by a bottom wall and two side walls linked, preferably directly, to said bottom wall, characterized in that said side walls have planar inner faces converging towards one another away from said bottom wall.

In the present application, a section is understood to be a cross section unless specified otherwise. In the following description, "housing according to the invention" should be understood to mean a housing (for receiving a spine or a heel of a wiper blade) whose side walls have planar inner faces which converge towards one another.

It will be understood that the housing according to the invention thus has, in cross section, at least partly, a substantially trapezoidal form (and not rectangular, as in the prior art), the large base of which is situated on the side of the bottom wall. It is thus possible to consider reducing, even eliminating the abovementioned fitting plays between the spine and the side walls defining its housing, and/or between the heel of the blade and the side walls defining its housing.

The minimum length in cross section of said housing according to the invention can, for example, be substantially equal to the length in cross section of the spine or of the heel of the blade (that is to say to the width of the spine or of the heel). As a variant, the length in cross section of the spine or of the heel of the blade lies between the minimum length in cross section of said housing according to the invention of the member, and the maximum length in cross section of this housing. The side walls defining the housing according to the invention are then advantageously elastically deformable, particularly by bending. It will then be understood that the insertion of the spine or of the heel of the blade into the housing according to the invention will lead to an elastic deformation of the side walls. In the fitting position, the walls are stressed and bear on the spine or on the heel, which ensures that it is immobilized in the housing according to the invention.

Another advantage of the invention is to be able to fit spines or heels of wiper blades, of different lengths in cross section, into a housing according to the invention of one and the same longitudinal member which can thus be likened to a standardized part.

Moreover, it is advantageous for the inner faces of the side walls of a housing to be planar (rather than incurved for example) because this makes it possible to better control, and in particular reduce, the plays between the spine or the heel of the blade, and its housing. Moreover, planar walls make it possible to better control the transient noises and noises produced at the points of reversal of the wiper blade (that is to say at the fixed stopping and opposite fixed stopping positions). On the other hand, in the case of side walls of the housing of the blade that are completely incurved as in the prior art, a wiper blade of fir tree type which has a heel of T-shaped cross section will tend to exit from its housing and/or produce undesirable noises.

In cross section, the side walls can have a length less than that of the bottom wall. According to the invention, the inner faces of the side walls are planar. The side walls can thus have, in cross section, a substantially rectilinear elongate form. In other words, they do not have an incurved form in cross section.

In the case where the bottom wall is a lower wall, the inner faces of the side walls converge towards one another upwards, their upper longitudinal edges being closer to one another than their lower longitudinal edges. The bottom wall can be substantially planar.

The inner lateral face of each side wall is preferably substantially parallel to an outer lateral face of this side wall. It will thus be understood that the outer faces of the side walls (oriented in substantially opposite directions) are planar and also converge towards one another on the side opposite to said bottom wall.

Advantageously, in cross section, said inner faces extend substantially over the entire length of said side walls.

The inner faces can form between them an angle of between 1 and 30°, preferably between 1 and 25°, and more preferentially between 1 and 20°.

The side walls are preferably linked by their opposite longitudinal edges to the bottom wall with longitudinal flanges which extend substantially towards one another.

These flanges can have planar lower longitudinal faces facing said bottom wall and which converge towards one another and towards the bottom wall.

It will thus be understood that the height or the width in cross section of the housing according to the invention varies, the latter being greater at the level of the ends of the flanges linked to the side walls and smaller at the level of the free ends of the flanges.

The minimum width in cross section of the housing according to the invention can, for example, be substantially equal to the width in cross section of the spine or of the heel of the blade (that is to say to the thickness of the spine or of the heel). As a variant, the width in cross section of the spine or of the heel of the blade lies between the minimum width in cross section of said housing according to the invention of the member, and the maximum width in cross section of this housing. The flanges are then advantageously elastically deformable, particularly by bending. It will then be understood that the insertion of the spine or of the heel of the blade into the housing according to the invention will lead to an elastic deformation of the flanges. In the fitting position, the flanges are stressed and bear on the spine or the heel, which ensures the immobilization thereof in the housing according to the invention.

The lower face of each flange can be substantially parallel to an upper longitudinal face of this flange.

The flanges can have, in cross section, a substantially rectilinear elongate form.

Preferably, each flange is substantially perpendicular to the side wall to which it is linked.

The lower faces can form between them an angle of between 150 and 179°, preferably between 155 and 179°, and more preferentially between 160 and 179°.

The longitudinal member can comprise lateral longitudinal fixing hooks configured to cooperate with a longitudinal body of said wiper, this body possibly comprising an aerodynamic deflector.

As a variant, the longitudinal member itself comprises an aerodynamic deflector.

The member according to the invention is preferably formed of a single piece, in particular made of plastic material (such as polypropylene), for example by extrusion. The member can more preferably be produced from one or two materials, notably based on elastomer(s) and, for example, by extrusion or co-extrusion. A two-material member may make it possible to facilitate the optimization of its properties such as its flexibility. For example, the member may comprise a part for the production of the deflector that is more flexible or less hard than that of its part allowing for the retaining of the spine and/or the holding of the wiper blade. The upper part is preferably stiff enough to facilitate its cutting to form a housing for receiving the connector of the wiper, avoiding the risk of weakening the body when performing this cutting.

The member according to the invention can have a median longitudinal plane of symmetry.

The present invention also relates to an assembly comprising a longitudinal member as described above, a stiffening spine and/or a wiper blade, in which the length in cross section of the spine or of the heel of the blade lies between the minimum length in cross section of said housing of the member with convergent planar inner faces, and the maximum length in cross section of this housing.

The present invention also relates to an assembly comprising a longitudinal member as described above, a stiffening spine and/or a wiper blade, in which each of said planar inner faces forms a single line of contact with said spine or the heel of said blade (and not a contact surface as in the prior art). Thus, in cross section, each planar inner face forms a single point of contact with the spine or the heel of the blade (and not a line of contact as in the prior art).

The present invention also relates to a windscreen wiper of a window of a vehicle, in particular a motor vehicle, comprising a longitudinal member as described above, a wiper blade and a stiffening spine, said spine or a heel of said blade being received in said housing with convergent planar inner faces.

The present invention relates finally to a method for manufacturing, by extrusion, a longitudinal member for retaining a stiffening spine and holding a wiper blade for a windscreen wiper of a window of a vehicle, in particular a motor vehicle, said member defining at least one first longitudinal housing for receiving the spine and at least one second longitudinal housing for receiving a heel of the wiper blade, at least one of said first and second housings being delimited at least partly by a bottom wall and two side walls linked to said bottom wall, said side walls having, in cross section, a substantially rectilinear elongate form, characterized in that the member is produced by means of an extrusion die which is configured so that said side walls have inner faces converging towards one another away from said bottom wall.

The method according to the invention is distinguished from those of the prior art essentially in that the extrusion die is specifically designed to produce a longitudinal member according to the invention.

The inventors have found that a weakening of the side walls of a longitudinal member of a windscreen wiper could occur during an extrusion operation, resulting in side walls with inner faces diverging from one another on the side opposite to said bottom wall (even though the extrusion die was designed to produce perfectly parallel side walls). The inner faces of the side walls of the member according to the invention are inclined in a contrary fashion, which makes it possible to reduce, even eliminate, the fitting plays, as explained in the above.

The invention will be better understood, and other details, features and advantages of the invention will become apparent on reading the following description given as a nonlimiting example with reference to the attached drawings, in which.

It should be noted that the figures explain the invention in a detailed manner for implementing the invention, said figures obviously being able to be used to better define the invention if necessary.

In the following description, the longitudinal or lateral qualifications refer to the orientation of the windscreen wiper according to the invention. The longitudinal direction corresponds to the main axis of the wiper in which it extends, whereas the side or lateral orientations correspond to concurrent lines, that is to say lines which cross the longitudinal direction, notably at right angles to the longitudinal axis of the wiper in its plane of rotation. For the longitudinal directions, the outer or inner qualifications are assessed relative to the point of fixing of the wiper onto a wiper arm, the inner qualification corresponding to the part where the arm and a half wiper extend. Finally, the directions referred to as upper or lower correspond to orientations at right angles to the plane of rotation of the wiper, the lower qualification containing the plane of the windscreen.

Figure 1:
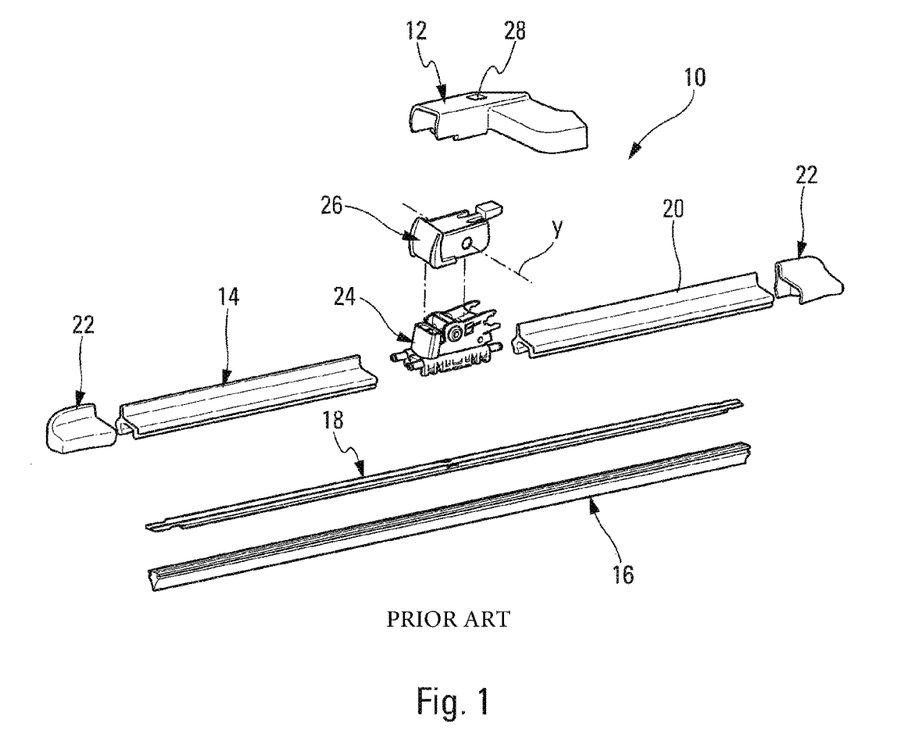
FIG. 1 is an exploded perspective view of a wiping system according to the prior art.

FIG. 1 illustrates a system according to the prior art for wiping a windscreen of a vehicle, in particular a motor vehicle. This system comprises a longitudinal windscreen wiper 10 and a wiper arm 12 which is partially represented and intended to be driven by a motor to follow an angular reciprocating motion making it possible to dispel the water and possibly other undesirable elements covering the windscreen.

The wiper 10 here comprises a longitudinal body 14, a longitudinal scraper blade 16, generally made of rubber, and at least one longitudinal spine 18 which confers a bow on the blade 16 so as to favour the application of this blade onto the windscreen.

The body 14 of the wiper 10 comprises an upper aerodynamic deflector 20 intended to enhance the operation of the wiper system, the aim of this deflector 20 being to improve the pressing of the wiper onto the windscreen and therefore the aerodynamic efficiency of the system.

The wiper 10 further comprises end fittings or clips 22 for attaching the blade 16 and the spine 18 onto the body, these clips 22 being situated at each of the longitudinal ends of the body 14.

The body 14 of the wiper is here produced in two separate parts which are arranged substantially end-to-end and coupled together by an intermediate connector 24. This connector 24 is therefore inserted between the two parts of the body 14 and comprises means for fixing to these parts.

To ensure its fitting onto the arm 12, the wiper 10 comprises an adapter 26 fitted to the connector 24 and allowing an articulation of the wiper 10 relative to the arm 12. The articulation of the wiper 10 relative to the arm 12 is an articulation by a rotational motion about an axis of rotation Y at right angles to the longitudinal axis of the wiper 10. The wiper 10 must in fact exhibit at least one degree of freedom in rotation relative to the arm 12, and more specifically relative to a terminal part 28 of the arm 12, to enable the wiper 10 to follow the curvature of the windscreen.

The invention relates to a particular type of windscreen wiper according to which the wiper further comprises a longitudinal member for holding the blade and/or retaining the spine.

Figure 2:
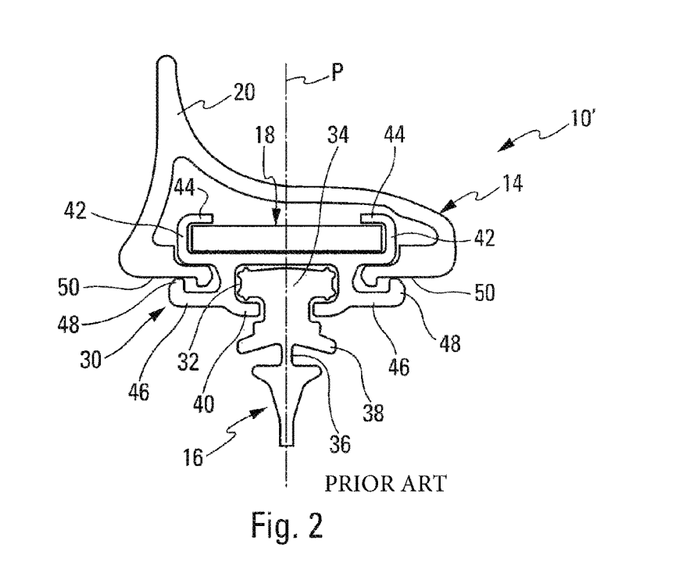
FIG. 2 is a schematic view in cross section of a windscreen wiper according to the prior art.

FIG. 2 represents a windscreen wiper 10' of this type according to the art prior to the present invention. The elements already described in the above are designated hereinbelow by the same reference numerals. Thus, the references 14, 16, 18, 20 respectively denote the body, the blade, the spine and the deflector of the wiper 10'.

The holding member 30 comprises two lateral longitudinal hooks 46. These hooks 46 are substantially coplanar, each hook 46 extending laterally on the side opposite the other hook. The hook 46 situated at the front of the wiper thus extends towards the front and the hook 46 situated at the rear of the wiper extends towards the rear. Each hook 46 comprises, at its free end, a longitudinal attachment tooth 48.

The body 14 of the wiper comprises, at its lower end, means for attachment to the holding member 30. In the example represented, the body 14 has two lateral longitudinal hooks 50 which are intended to cooperate with the hooks 46 of the holding member.

The hooks 50 are substantially coplanar and extend towards one another to define, between them, a slot into which the member 30 can slide and is fitted. The hook 50 situated at the front of the wiper thus extends towards the rear and the hook 46 situated at the front of the wiper extends towards the front. Each hook 50 comprises, at its free end, a longitudinal attachment tooth 52 intended to cooperate with the tooth 48 of the corresponding flange 46 of the member to limit the risks of accidental detachment of the body from the member.

The member 30 of the wiper 10' comprises a first housing or upper housing 42 for receiving the spine 18, which thus extends above the heel 34 of the blade.

The housing 42 is configured to receive the spine 18 by longitudinal sliding. This housing 42 is delimited by two side walls, the upper ends of which are each linked to a longitudinal flange 44. These flanges 44 are substantially coplanar and extend towards one another.

As can also be seen in the drawing, the spine 18 is fitted in the housing 42 with plays, both in the horizontal direction and in the vertical direction.

The longitudinal member 30 of the wiper 10' also comprises a second housing or lower housing 32 for receiving a longitudinal heel 34 of the blade 16. The blade 16 is, for example, of the fir tree type, well known to those skilled in the art. Its upper end is linked by a hinge 36 and a damping member 38 to the heel 34. As is known, in operation, the blade 16 can come into abutment on the member 38 which damps its reversal to the front or to the rear.

The housing 32 is configured to receive the heel 34 of the blade 16 by longitudinal sliding. This housing 32 is delimited by two side walls, the lower ends of which are each linked to a longitudinal flange 40. These flanges 40 are substantially coplanar and extend towards one another. They delimit, between them, a slot into which can slide and is fitted a thinned lower part of the heel 34 which has a substantially T-shaped section.

As can be seen in the drawing, the heel 34 is fitted in the housing 32 with plays, both in the horizontal direction and in the vertical direction (the median longitudinal plane P of the wiper being vertical).

The abovementioned plays are damaging for the reasons explained above. According to the invention, these plays are reduced, even eliminated, in particular by virtue of the inclination of inner faces of the walls defining at least one of the abovementioned housings.

Figure 3:
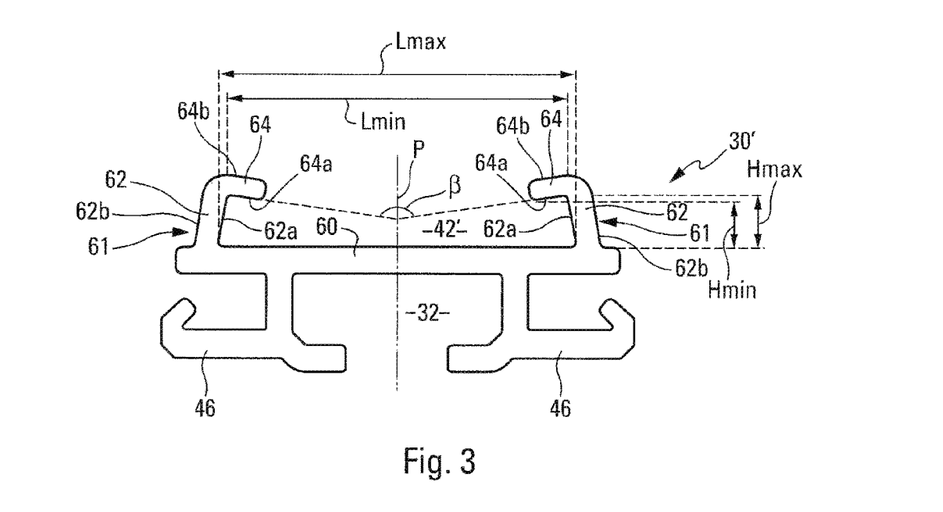
FIG. 3 is a schematic view in cross section of a longitudinal member for a windscreen wiper according to the invention.

FIG. 3 represents a first embodiment of the invention, the invention here being applied to a longitudinal member 30' of a windscreen wiper, for holding a wiper blade and retaining a bending spine, and being more particularly applied to the housing 42' for receiving the spine of this member.

All the features described above with reference to FIG. 2 are applicable to the embodiment of FIG. 3, apart from those relating to the upper housing 42. The member 30' notably comprises lateral longitudinal hooks 46 configured to cooperate with a longitudinal body, such as a body comprising an aerodynamic deflector, as is the case in FIG. 2.

The first housing or upper housing 42' for receiving the spine extends above the heel of the blade, as in the prior art.

The housing 42' is configured to receive the spine by longitudinal sliding. This housing 42' is delimited by a lower or bottom horizontal wall 60 and by two lateral longitudinal hooks 61 which extend upwards from the bottom wall 60.

These hooks 61 are each substantially L-shaped in section. Each hook 61 comprises a side wall 62, the lower longitudinal edge of which is linked to the lower wall 60 and the upper longitudinal edge of which is linked to an upper flange 64 oriented towards the other hook 62.

Each side wall 62 comprises a planar inner lateral face 62a oriented towards the other side wall and a planar outer lateral face 62b oriented in an opposite direction. The inner lateral faces 62a extend substantially over the entire height of the side walls 62 (or over the entire length of these walls, when considering a cross section of these walls, as represented in the drawings).

Similarly, each upper flange 64 comprises a planar lower face 64a oriented towards the bottom wall 60 and a planar upper face 64b oriented in an opposite direction. The faces 64a extend substantially over the entire width of the flanges 64 (or over the entire length of these flanges, when considering a cross section of these flanges, as represented in the drawings).

The faces 62a and 62b of one and the same side wall 62 are, here, substantially parallel. The faces 64a and 64b of one and the same flange 64 are, here, substantially parallel. Moreover, the faces 62a and 62b of a wall 62 are substantially perpendicular to the faces 64a and 64b of the flange 64 linked to this wall.

According to the invention, the faces 62a converge towards one another away from said bottom wall 60, that is to say upwards. They converge, which means that they are not parallel and, on the contrary, form between them an angle which is, here, between 1 and 30°. The faces 62b converge also towards one another upwards and form between them an angle which is, here, between 1 and 30°.

In the example represented, the angles of inclination of the side walls 62 or of their faces 62a, relative to the bottom wall 60, are substantially equal so that the hypothetical extension surfaces of the faces 62a upwards meet substantially at the median plane P of the member 30'.

The width L or horizontal transverse dimension between the facing lateral faces 62a varies continuously in the vertical direction, and is maximum (value Lmax) at the lower end of the hooks 61 or walls 62, and minimum (value Lmin) at the upper end of the hooks 61 or walls 62.

In the example represented, the faces 64a converge towards one another and towards the bottom wall 60, that is to say downwards. They are therefore not parallel and, on the contrary, form between them an angle β which is, here, between 130° and 179°. The faces 64b also converge towards one another downwards and form between them an angle which is, here, between 130 and 179°.

The angles β of inclination of the flanges 64 or of their faces 64a, relative to the bottom wall 60, are substantially equal so that the hypothetical extension surfaces of the faces 64a downwards meet substantially at the median plane P, as can be seen in the drawing.

The height H or vertical transverse dimension between the lower faces 64a of the flanges 64 on the one hand and the upper face of the bottom wall 60 on the other hand varies in the horizontal direction, and is minimum (value Hmin) at the free ends of the flanges 64 and maximum (value Hmax) at their ends opposite the flanges 64.

Advantageously, the member 30' according to the invention is associated with a stiffening longitudinal spine, the width (or length in cross section) of which lies between Lmin and Lmax, and the thickness (or width in cross section) of which lies between Hmin and Hmax, as will be explained in more detail hereinbelow with reference to FIG. 5.

The member 30' is here produced in a single piece and in a single material (preferably plastic), for example by extrusion. The member 30' can more preferably be produced from one or two materials, notably based on elastomer(s), and, for example, by extrusion or co-extrusion as described previously.

Figure 4:
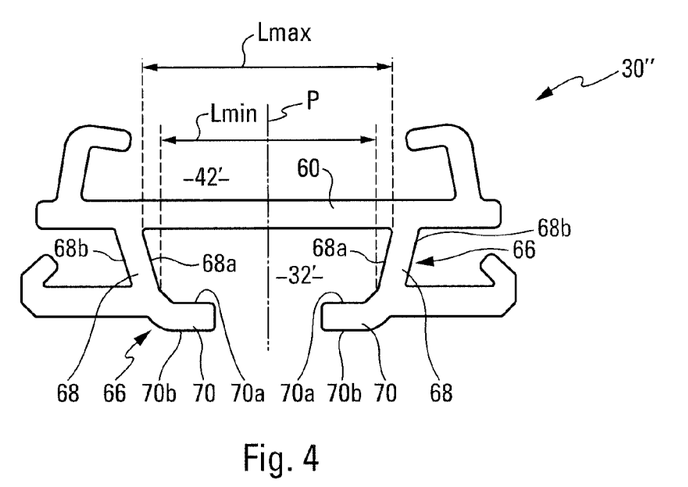
FIG. 4 is a schematic view in cross section of a variant embodiment of the longitudinal member according to the invention.

FIG. 4 represents a variant embodiment of the invention, the invention here being applied to a longitudinal member 30" of a windscreen wiper for holding a wiper blade and retaining a bending spine, and being more particularly applied to the housing 32' for receiving the heel of the blade of this member.

All the features described above with reference to FIGS. 2 and 3 are applicable to the variant embodiment of FIG. 4, apart from those relating to the lower housing 32.

The second housing or lower housing 32' for receiving the heel of the wiper blade thus extends under the spine as in the prior art.

The housing 32' is configured to receive the heel of the blade by longitudinal sliding. This housing 32' is delimited (at least partly) by the horizontal or bottom wall 60 and by two lateral longitudinal hooks 66 which extend downwards from the bottom wall 60.

These hooks 66 each have a substantially L-shaped section. Each hook 66 comprises a side wall 68, the upper longitudinal edge of which is linked to the lower wall 60 and the lower longitudinal edge of which is linked to an upper flange 70 oriented towards the other hook 66.

Each side wall 66 comprises a planar inner lateral face 66a oriented towards the other side wall and a planar outer lateral face 66b oriented in an opposite direction. The inner lateral faces 66a extend substantially over the entire height of the side walls 66 (or over the entire length of these walls, when considering a cross section of these walls, as represented in the drawings).

Similarly, each upper flange 70 comprises a planar lower face 70a oriented towards the bottom wall 60 and an upper face 70b oriented in an opposite direction. The faces 70a extend substantially over the entire width of the flanges 70 (or over the entire length of these flanges, when considering a cross section of these flanges, as represented in the drawings).

The faces 68a and 68b of one and the same side wall 68 are, here, substantially parallel. The faces 70a and 70b of one and the same flange 64 are, here, substantially parallel.

Moreover, the faces 68a and 68b of a wall 68 are substantially perpendicular to the faces 70a and 70b of the flange 70 linked to this wall.

According to the invention, the faces 68a converge towards one another away from said bottom wall 60, that is to say downwards. They converge, which means that they are not parallel and, on the contrary, form between them an angle which is, here, between 1 and 30°. The faces 62b also converge towards one another upwards and form between them an angle which is, here, between 1 and 30°.

In the example represented, the angles of inclination of the side walls 68 or of their faces 68a, relative to the bottom wall 60, are substantially equal so that the hypothetical extension surfaces of the faces 68a downwards meet substantially at the median plane P of the member 30".

The width L or horizontal transverse dimension between the facing lateral faces 68a varies continuously in the vertical direction, and is maximum (value Lmax) at the upper end of the hooks 61 or walls 68, and minimum (value Lmin) at the lower end of the hooks 66 or walls 68.

In the example represented, the faces 70a of the flanges 70 are substantially parallel to the bottom wall 60.

Advantageously, the member 30" according to the invention is associated with a wiper blade, the heel of which has a width (or length in cross section) of between Lmin and Lmax.

Figure 5:
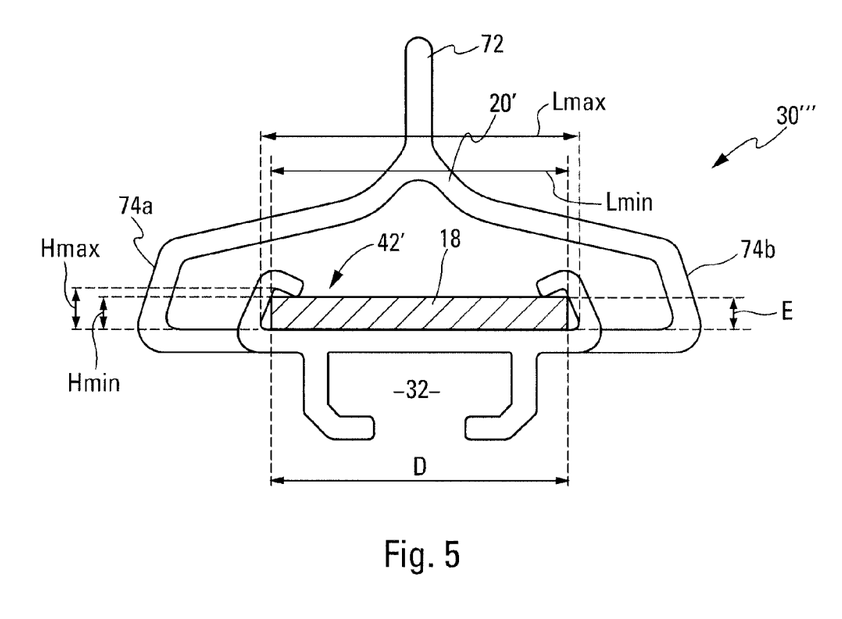
FIGS. 5 to 7 are schematic views in cross section of variant embodiments of the longitudinal member according to the invention.

Reference is now made to FIG. 5, which represents another variant embodiment of the invention in which the member 30''' is, here, formed from a single piece with a body 14' comprising an aerodynamic deflector 20'.

The member 30''' comprises all the features of the member 30' of FIG. 3 in relation to the upper housing 42', and all the features of the member 30 of FIG. 2 in relation to the lower housing 32.

The body 14' has a form, in cross section, having substantially two parts, respectively lower and upper. The upper part of the body 14' comprises the deflector 20'. This deflector 20' here has a triangle- or dihedron-shaped section, the top or upper end of which is linked to a substantially vertical longitudinal ridge 72. This dihedron comprises two inclined side walls, respectively front and rear, forming an angle of approximately 90°.

The lower part of the body 14' is defined by two side walls, respectively front 74a and rear 74b, which each have a substantially C-shaped section. The opening of the C of a wall 74a, 74b being oriented towards the other wall 74b, 74a. Each wall 74a, 74b comprises an upper longitudinal edge linked to a lower longitudinal edge of the dihedron of the upper part of the body, and a lower longitudinal edge which is linked to the member 30'''. Each wall 74a, 74b defines a longitudinal cavity which extends along one side of the member 30'''.

The body 14' and the member 30''' are formed from a single piece, for example by extrusion, from two different materials, a first material for the body 14' and a second material for the member 30'''. The link zones between the two materials are, here, situated between the lower longitudinal edges of the walls 74a, 74b and the member 30'''.

A stiffening spine 18 is fitted into the first housing 42' of the member 30'''. As indicated in the above, this spine 18 has a width D (or length in cross section) which lies between Lmin and Lmax, and a thickness E (or width in cross section) which lies between Hmin and Hmax.

Thus, the insertion of the spine 18 by sliding into the housing 42' (the spine 18 being able to have, at its longitudinal ends, inlet chamfers to facilitate this insertion) leads to an elastic deformation of the hooks 61 (and in particular of their walls 62 and of their flanges 64) which will be separated from one another. In the position of fitting of the spine as represented in FIG. 5, the side walls 62 bear by the upper ends of their inner faces 62a on the spine, and the hooks 64 bear by the free ends of their lower faces 64a on the spine. These bearing arrangements locally eliminate the horizontal and vertical plays between the member and the spine and therefore ensure that the latter is well held by preventing it from being displaced in operation.

Figure 6:
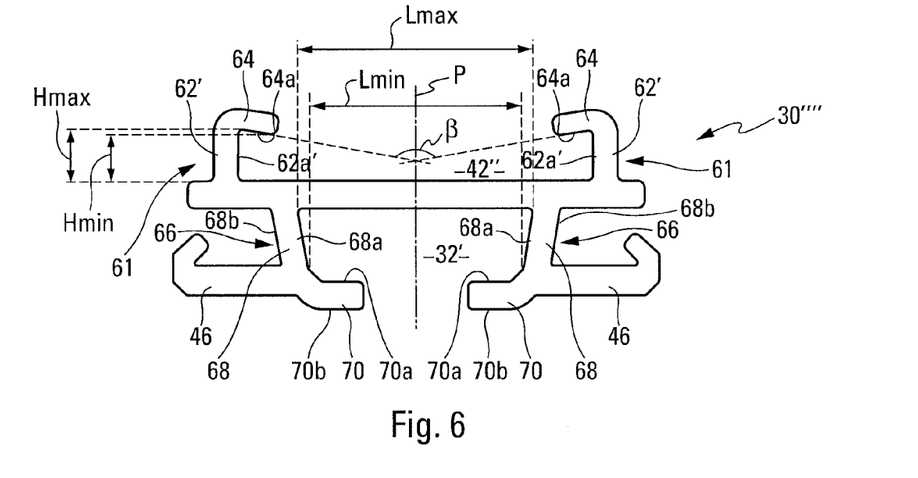

Reference is now made to FIG. 6 which represents a variant embodiment of the invention which differs from the embodiment of FIG. 4 essentially in that the side walls 62' of the housing 42" of the spine are parallel. The inner faces 62a' of the side walls 62' are therefore parallel to one another.

As is the case in FIG. 4, the flanges 64 have their faces 64a which converge towards one another and towards the bottom wall 60, that is to say downwards. They are therefore not parallel and, on the contrary, form between them an angle β which is, here, between 130° and 179°. The faces 64b also converge towards one another downwards and form between them an angle which is, here, between 130 and 179°.

The angles β of inclination of the flanges 64 or of their faces 64a, relative to the bottom wall 60, are substantially equal so that the hypothetical extension surfaces of the faces 64a downwards meet substantially at the median plane P, as can be seen in the drawing.

The height H or vertical transverse dimension between the lower faces 64a of the flanges 64 on the one hand and the upper face of the bottom wall 60 on the other hand varies in the horizontal direction, and is minimum (value Hmin) at the free ends of the flanges 64 and maximum (value Hmax) at their ends opposite the flanges 64.

Advantageously, the member 30"" according to the invention is associated with a stiffening longitudinal spine, the thickness (or width in cross section) of which lies between Hmin and Hmax.

The housing 32' and the hooks 66 of the member 30"" are identical to those of the member 30" of FIG. 4.

The member 30"" is here produced in a single piece and in a single material (preferably plastic), for example by extrusion.

Figure 7:
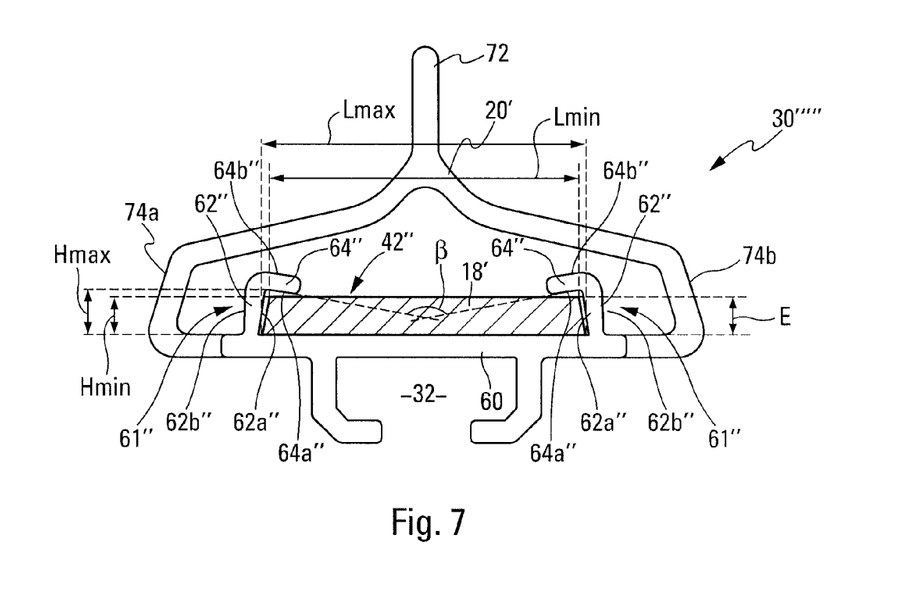

Reference is now made to FIG. 7 which represents a variant embodiment of the invention which differs from the embodiment of FIG. 5 essentially in that the side walls 62" of the housing 42''' have their outer faces 62b" which are substantially parallel, whereas their inner faces 62a" converge towards one another away from the bottom wall 60. The inner 62a" and outer 62b" faces of one and the same side wall 62" are therefore not parallel to one another.

The faces 62a" converge towards one another upwards and form between them an angle which, here, lies between 1 and 30°.

In the example represented, the angles of inclination of the side walls 62" or of their faces 62a", relative to the bottom wall 60, are substantially equal so that the hypothetical extension surfaces of the faces 62a" upwards meet substantially at the median plane P of the member 30""'.

The width L or horizontal transverse dimension between the facing lateral faces 62a" varies continuously in the vertical direction, and is maximum (value Lmax) at the lower end of the hooks 61" or walls 62", and minimum (value Lmin) at the upper end of the hooks 61" or walls 62".

In the example represented, the faces 64a" converge towards one another and towards the bottom wall 60, that is to say downwards. They are therefore not parallel and, on the contrary, form between them an angle β which is, here, between 130° and 179°. The faces 64b" also converge towards one another downwards and form between them an angle which is, here, between 130 and 179°.

The angles β of inclination of the flanges 64" or of their faces 64a", relative to the bottom wall 60, are substantially equal so that the hypothetical extension surfaces of the faces 64a" downwards meet substantially at the median plane P, as can be seen in the drawing.

The height H or vertical transverse dimension between the lower faces 64a" of the flanges 64" on the one hand and the upper face of the bottom wall 60 on the other hand varies in the horizontal direction, and is minimum (value Hmin) at the free ends of the flanges 64" and maximum (value Hmax) at their ends opposite the flanges 64".

Advantageously, the member 30''''' according to the invention is associated with a stiffening longitudinal spine 18' which has a substantially trapezoidal form in cross section. The spine 18' has a minimum width (or length in cross section) (at its upper end corresponding to the small base of the trapezoid) substantially equal to Lmin and a maximum width (at its lower end corresponding to the large base of the trapezoid) substantially equal to Lmax. The spine 18' has a thickness (or width in cross section) of between Hmin and Hmax.

The member 30''''' is here produced in a single piece and in a single material (preferably plastic), for example by extrusion.

In all the exemplary embodiments of the invention described in the above, it is observed that, in cross section, each inner face 62a, 62a', 62a", 68a forms a single point of contact with the spine or the heel of the blade (and not a line of contact as in the prior art).

FIGS. 8 to 11 represent one and the same longitudinal member 300 in each of which there is a different spine. The elements already described in the preceding figures are not designated, only the notable differences will be described in conjunction with these figures.

Figure 8:
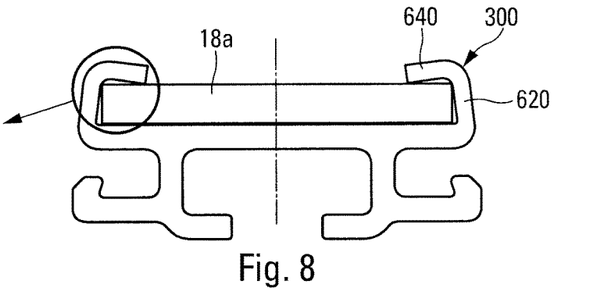
FIGS. 8 to 11 are schematic views in cross section of variant embodiments of the longitudinal member according to the invention.

Referring to FIG. 8, a spine 18a with no particular coating and of conventional size, for example 10.1 mm×1.02 mm, is inserted into the longitudinal member 300. To this end, the faces 620 converge towards one another away from the bottom wall, that is to say upwards.

This embodiment approximates roughly to the embodiment described in FIG. 3 and thus makes it possible to house a spine 18a in a longitudinal member 300 without play, by virtue of the convergence of the walls 620 which make it possible to eliminate the lateral play of the spine 18a in the longitudinal member 300.

Figure 9:
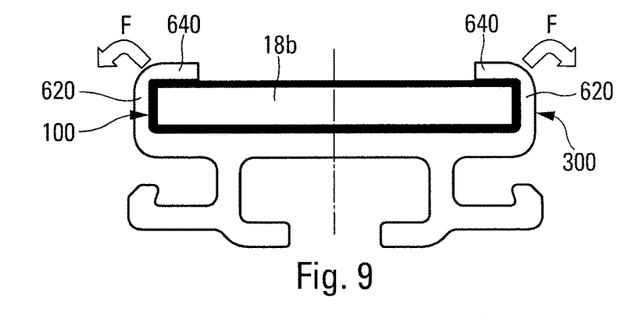

As a variant, in FIG. 9, a spine 18b, with the difference that this spine 18b is coated with a layer 100 of PET, is inserted into the same longitudinal member 300 as in the preceding figure. Thus, the spine 18b has dimensions greater than the spine 18a of FIG. 8, for example 10.3 mm×1.25 mm. We note that, with this spine 18b, there is no longer any free space between the faces 620 and the spine 18b. In the final position of fitting of the spine 18b in the housing of the longitudinal member 300, the faces 620 no longer converge towards one another away from the bottom wall but are substantially parallel. Since the spine 18b is wider than the spine 18a, the walls 620 are pushed back outwards according to the arrow F. In other words, upon the insertion of the spine 18b into the housing of the longitudinal member 300, the walls 620 move away from the bottom wall relative to their position of FIG. 8.

One and the same longitudinal member (FIG. 8 and FIG. 9) 300 thus makes it possible to house at least two types of spines (18a, 18b) having different sizes.

Figure 8A:
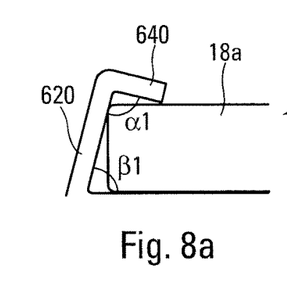

FIG. 8a shows a specific view of the points of contact between the spine 18a and the longitudinal member 300.

In order to be more easily adaptable to different spine sizes, the longitudinal member 300 preferably exhibits an angle α1 between the side wall 620 and the flange wall 640 of approximately 15°.

An angle β1 defined between the side wall 620 and the bottom wall will, for its part, be variable according to the different spines.

Preferably, we can define the angle β1 by the following relationship: angle β1=arctan (height of spine/width of spine).

As an example, the table below gives us a value of the angle β1 as a function of the dimensions of the different spines.

| Spine width | Spine height | Angle β1 |
|---|---|---|
| 10.3 mm | 1.25 mm | 90° |
| 10.1 mm | 1.2 mm | 84.4° |
| 9.2 mm | 1.15 mm | 64.4° |
| 9 mm | 1 mm | 57° |

Figure 10:
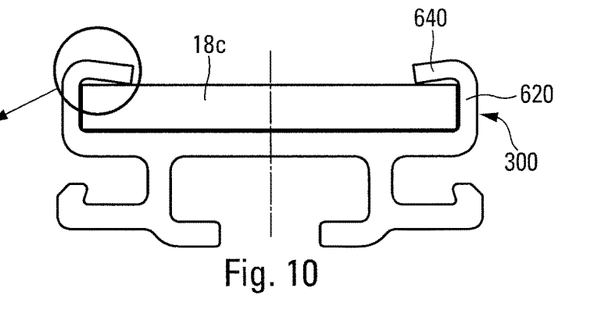
Figure 10A:
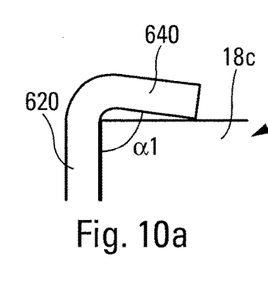

Referring to FIG. 10, a spine 18c with no particular coating and of conventional size, for example 10.3 mm×1.2 mm, is inserted into the longitudinal member 300. In the final position of fitting of the spine 18c in the longitudinal member 300, the faces 620 no longer converge towards one another away from the bottom wall but are substantially parallel. Unlike in FIG. 9, there is a space between the flange wall 640 and the spine 18c. As can be seen in FIG. 10a, this space exists by virtue of the angle α of approximately 15° between the side wall 620 and the flange wall 640.

The longitudinal member 300 of FIG. 10 makes it possible to house a spine that has a width substantially equal to the spine 18b of FIG. 9, but with a lesser height, all while avoiding a relative displacement between the spine 18c and the longitudinal member 300 by virtue of the pressure of the flange wall 64a on the spine 18c.

Figure 11:
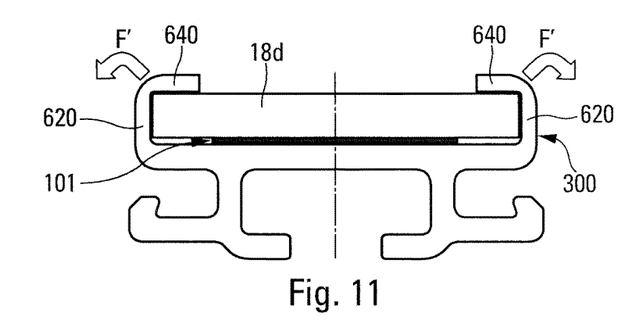

Unlike in FIG. 10, we can note that, on the lower face of the spine 18d of FIG. 11, there is a heating film 101. The lower face of the spine 18d is considered to be the face facing the bottom wall. Since the film has a defined thickness, this thickness makes it possible to compensate for the space visible in FIG. 10 between the flange wall 640 and the spine 18c. Thus, since the spine 18d is higher than the spine 18c, the flange walls 640 are pushed back outwards according to the arrow F'. In other words, upon the insertion of the spine 18d into the housing of the longitudinal member 300, the walls 640 move away from the bottom wall relative to their position of FIG. 10.

One and the same longitudinal member (FIG. 10 and FIG. 11) 300 thus makes it possible to house at least two types of spines (18c, 18d), one conventional or the other having a heating film, while being held optimally.

The present invention also relates to a method for manufacturing, by extrusion, a longitudinal member 30', 30", 30''', 30'''', 30''''', 300 as described in the above. For this, the member 30', 30", 30''', 30'''', 30''''', 300 is produced by means of an extrusion die which is configured so that said side walls 62, 62', 62", 68, 620 have planar inner faces 62a, 62a', 62a", 68a which converge towards one another away from the bottom wall 60.

As is represented in FIG. 1, the member 30', 30", 30''', 30'''', 30''''', 300 according to the invention can be associated, in addition to a spine 18, a blade 16, and possibly a body 14 (if the latter is not already incorporated into the member, as is the case of the member 30''' of FIG. 5), with a connector 24 and with end fittings 22 of the windscreen wiper. The member 30', 30", 30''', 30'''', 30''''', 300 can, furthermore, comprise means for circulating a windscreen washer liquid and/or means for heating the wiper and/or said liquid.

The invention claimed is:

1. A longitudinal member for retaining a stiffening spine and holding a wiper blade for a windscreen wiper of a window of a motor vehicle, comprising:
   at least one first longitudinal housing for receiving the spine; and
   at least one second longitudinal housing for receiving a heel of the wiper blade,
   at least one of said first and second housings being delimited at least partly by:
      a horizontal bottom wall, and
      two vertical side walls linked to said bottom wall,
   wherein:
      the two vertical side walls have longitudinal flanges that extend substantially towards one another on each side,
      the two vertical side walls link the longitudinal flanges to the bottom wall by opposite longitudinal edges thereof,
      the two vertical side walls have planar inner faces converging towards one another directly away from said bottom wall, and
      the flanges have planar lower longitudinal faces facing said bottom wall and which converge towards one another and towards the bottom wall.

2. The longitudinal member according to claim 1, in which the inner face of each side wall is substantially parallel to an outer face of this side wall.

3. The longitudinal member according to claim 1, in which, in cross section, said inner faces extend substantially over an entire length of said side walls.

4. The longitudinal member according to claim 1, in which said inner faces form between them an angle of between 1 and 20°.

5. The longitudinal member according to claim 1, in which said lower face of each flange is substantially parallel to an upper longitudinal face of this flange.

6. The longitudinal member according to claim 1, in which said flanges have, in cross section, a substantially rectilinear elongate form.

7. The longitudinal member according to claim 1, in which each flange is substantially perpendicular to the side wall to which it is linked.

8. The longitudinal member according to claim 1, in which the flanges have lower faces that form between them an angle between 160 and 179°.

9. The longitudinal member according to claim 1, further comprising lateral longitudinal fixing hooks that cooperate with longitudinal hooks of a longitudinal body of said wiper wherein:
   the longitudinal body comprises at least an aerodynamic deflector.

10. The longitudinal member according to claim 1, comprising an aerodynamic deflector.

11. An assembly comprising:
   a longitudinal member according to claim 1; and
   a stiffening spine and/or a wiper blade, in which a length in cross section of the spine or the heel of the blade lies between a minimum length in cross section of said housing of the member with convergent planar inner faces, and a maximum length in cross section of this housing.

12. The assembly according to claim 11, in which each of said planar inner faces forms a single line of contact with said spine and/or said wiper blade.

13. A windscreen wiper of a window of a motor vehicle, comprising:
   a longitudinal member according to claim 1;
   a wiper blade; and
   a stiffening spine,
   wherein:
      the spine or a heel of said blade being received in the housing with the convergent planar inner faces.

14. A longitudinal member for retaining a stiffening spine and holding a wiper blade for a windscreen wiper of a window of a motor vehicle, comprising:
   at least one first longitudinal housing for receiving the spine; and
   at least one second longitudinal housing for receiving a heel of the wiper blade,
   at least one of said first and second housings being delimited at least partly by:
      a bottom wall, and
      two side walls linked to said bottom wall,
   wherein:
      the side walls have longitudinal flanges that extend substantially towards one another on each side,
      the side walls link the longitudinal flanges to the bottom wall by opposite longitudinal edges thereof,
      the side walls have planar inner faces converging towards one another directly away from the bottom wall,
      the flanges have lower faces that form between them an angle between 150 and 179° when viewed from a top side of the member, and
      the flanges have an end surface that directly contacts the stiffening spine when the spine is retained by the longitudinal member.

15. The longitudinal member according to claim 14, wherein the longitudinal flanges extend substantially toward one another and toward the bottom wall.

16. The longitudinal member according to claim 14, wherein the inner face of each side wall is substantially parallel to an outer face of this side wall.

17. A windscreen wiper of a window of a motor vehicle, comprising:
   a longitudinal member according to claim 14;
   a wiper blade, and
   a stiffening spine,
   wherein:
      the spine or a heel of said blade being received in the housing with the convergent planar inner faces.

18. An assembly comprising:
   a longitudinal member according to claim 14; and
   a stiffening spine and/or a wiper blade, in which a length in cross section of the spine or the heel of the blade lies between a minimum length in cross section of said housing of the member with convergent planar inner faces, and a maximum length in cross section of this housing.

* * * * *